INVENTOR.
Myran Kalfaian

INVENTOR.
Megun Kalfaian

Sept. 23, 1952 M. KALFAIAN 2,611,826

SIMULTANEOUS AMPLITUDE MODULATION AND PHASE MODULATION WITH ECONOMY IN BANDWIDTH

Filed June 5, 1947 4 Sheets-Sheet 3

INVENTOR.

Meguer Kalfaian

Sept. 23, 1952 M. KALFAIAN 2,611,826

SIMULTANEOUS AMPLITUDE MODULATION AND PHASE MODULATION WITH ECONOMY IN BANDWIDTH

Filed June 5, 1947 4 Sheets-Sheet 4

INVENTOR.

Meyer Kalfaian

Patented Sept. 23, 1952 2,611,826

UNITED STATES PATENT OFFICE 2,611,826

SIMULTANEOUS AMPLITUDE MODULATION AND PHASE MODULATION WITH ECONOMY IN BANDWIDTH

Meguer Kalfaian, Asbury Park, N. J.

Application June 5, 1947, Serial No. 752,601

3 Claims. (Cl. 179—15)

This invention relates to time-division modulating systems, and more particularly to methods and means for simultaneously amplitude and phase modulating the time-divided carrier by first and second intelligence waves. Its main object is to waveshape the time-divided carrier envelopes, so as to avoid widely expanded multiple pairs of sideband components that are usually associated with steep sided rise and fall of the carrier envelopes.

In the general mode of time-division transmission, where the carrier is interrupted abruptly at a sub-carrier frequency $f_m$, and the modulation wave having frequencies not exceeding $f_m/2$ is carried over the peaks of the interrupted envelopes, the sidebands repeat successively in complementary pairs around the carrier; occupying frequency spaces between $f_m$, $2f_m$, $3f_m$, etc., with gradually diminishing amplitudes. Such expansion of sidebands may be narrowed to the regions of the first pair $f_m$, by pre-fixing the waveshape on each side of succeeding envelopes to the simplest curve of sine-squared function, which rises and falls from substantially zero level of the carrier in not less than a definite time period $t_m$. However, even with such waveshaping of the carrier envelopes, the modulation frequency is limited to $f_m/2$ in a bandwidth of $2f_m$, because the modulation wave is conveyed only over the peaks of the envelopes. In other words, the time of signal resolution allowed is twice the time that is normally required in the alternating type of modulation (signals carried over positive and negative alternations of the carrier envelopes); causing a waste of useful bandwidth. This loss of signal information may be filled in, by simultaneously modulating the carrier phase by a second modulating wave. In this case again, in order to avoid further expansion of sidebands, and to effect pure phase modulation, the carrier phase in each succeeding envelope is shifted step by step representative of the modulating wave, in a manner that, the angle is shifted abruptly at the minimum (substantially zero) carrier level, so as to avoid transient effects between the succeeding phase shifts. The final modulated carrier will then contain sidebands on both sides of the carrier, restricted to the regions of $f_m$; conveying two separate modulating waves which range in frequencies from zero to $f_m/2$; with the advantage of each signal being readily separable from one another by way of the two types of modulation. Such sideband restriction may be explained by the following analysis:

In pure amplitude modulation, the behavior of side-frequency-wave as produced by the carrier wave, and bandwidth as occupied by information, are characteristically different one from the other. The first is manifested to be effected by the time shift of the carrier wave maxima, and the second is determined by the frequency rate at which the carrier amplitude changes. The second case may be explained briefly (for comparison purpose) by an example of sinusoidal modulation, where composite frequencies are represented by the fundamental and two complementary side frequencies. As is well known, a sharply tuned circuit will respond maximum when resonated at any one of these three frequencies, but negligibly minimum at all other frequencies. When the resonance of the circuit is tuned close to the fundamental, the carrier cycles assume an in-phase relation with the resonant frequency of the circuit for a considerable length of time, and contribute an oscillatory excitation therein. However, the carrier cycles gradually become out of phase with the free oscillation of the circuit, and (because of symmetry in amplitude reversal) cancel out the original contribution. With the assumption that the resolution time constant of the circuit is low, compared to the time of phase reversal, the magnitude of stored oscillation at the output will be negligible. When the circuit is continually tuned away from the fundamental, the length time during which such contribution and cancellation occurs becomes less and less, until at side-frequency point (where this time-period constitutes one cycle of the modulation frequency), the tuned circuit displays a sharp response to the carrier (side frequency), which evidently is not due to the amplitude-change of the carrier, but some other phenomena that represents frequency-change. This phenomena may be explained as in the following:

In the simple case of pure amplitude modulation, the zero crossings of the carrier wave are equally spaced, and therefore, the carrier represents fundamentally a single frequency. However, in the act of amplitude change, the maxima of the carrier half-cycles shift from normal time positions, which behave as though the carrier half-cycles were changing in time, and possessing additional frequencies. Accordingly, a modulated carrier voltage has essentially two components: one emanating from the carrier without time shift of the maxima, and one emanating from the carrier voltage that experiences these time shifts.

The power derived from the carrier voltage that experiences time shift of the maxima is attributed to the side-frequency-waves, since in their absence this voltage is also absent. Hence, if we determine the output of this power, we will determine the power contribution of the side-frequency-waves at any given instant.

The carrier voltage that experiences these time shifts may be found by writing the modulation voltage, as:

$$e=(a+b\cos\theta_m)\cos\theta_c \qquad (1)$$

where $\theta_m$ and $\theta_c$ are the instantaneous phase angles of the sinusoidal modulation envelope and the carrier respectively, while $a$ and $b$ are constants. In general, $b$ is smaller or equal to $a$, and therefore, Equation 1 may be written, as:

$$e=a\,(1+K\cos\theta_m)\cos\theta_c \qquad (2)$$

To find the positive or negative shift of the maxima, Equation 2 may be differentiated and set the derivative equal to zero.

$$\frac{de}{dt}=-a(1+K\cos\theta_m)\sin\theta_c\frac{d\theta_c}{dt}-aK\sin\theta_m\cos\theta_c\frac{d\theta_m}{dt}=0 \qquad (3)$$

$$\frac{d\theta_m}{dt}=2\pi f_m$$

and $$\frac{d\theta_c}{dt}=2\pi f_c$$

Therefore, Equation 3 may be simplified and solved for $\theta_c$, as follows:

$$\tan\theta_c=-(f_mK\sin\theta_m)/f_c(1+K\cos\theta_m) \qquad (4)$$

$$\phi=-\arctan\left((f_m/f_c)(K\sin\theta_m)/(1+K\cos\theta_m)\right) \qquad (5)$$

where $\phi$=sidewise shift of the maxima from normal. By further simplifying Equation 5:

$$\phi=\arctan\,(Kf_m/f_c) \qquad (6)$$

$$f_m=f_c\tan\phi/K \qquad (7)$$

Equation 7 shows that the term $(f_c\tan\phi/K)$ is added carrier component that experiences time shift of the maxima. Therefore, the fundamental carrier contains plus and minus this component, which contribute to the side-frequency-waves.

Since $(f_c\tan\phi/K)$ is equal to the impressed modulating frequency $f_m$, we may determine the power contribution $P_s$ of this component at a given instant, by writing the instantaneous voltage and current of $f_m$, as:

$$e_m=KE_m\sin w_mt$$
$$i_m=KI_m\sin w_mt \qquad (8)$$

Accordingly, the side band power $P_s$ may be written by multiplying the two terms of current and voltage, as:

$$P_s=KE_mI_m\sin^2 w_mt$$
$$=K\tfrac{1}{2}E_mI_m\,(1-\cos 2\,w_mt) \qquad (9)$$

The average value of $(\cos 2w_mt)$ is zero, hence, the average value of power is:

$$P_s=\tfrac{1}{2}E_mI_m \qquad (10)$$

Equation 10 agrees with the average value of power generally given for side components. However, Equation 9 shows that the frequency associated with the power arising from side-frequency-wave is exactly twice the frequency of the impressed modulating voltage. Furthermore, it shows that the power output of side component is maximum at the steepest part of the modulation envelope. Accordingly, the phase relations of the instantaneous power output of the carrier and side component may be shown graphically as in Fig. 1, wherein $a$ illustrates the condition existing in 100% modulation, and $b$ in 50% modulation.

It will be noted that the power of the carrier $P_c$ varies from a fixed reference level equal to 1, whereas, the power $P_s$ arising from side component varies from a fixed level equal to 0. In other words, the power output of side component is 100% modulated at a frequency $2w_m$ regardless of the modulation ratio K. This shows that the side components are not independent carriers; if they were, the amplitude variation of the carrier at frequency $2w_m$ would cause further pairs of their own side-frequency-waves. The side components are merely possessed by the carrier wave when changed in amplitude from one steady state to another, in the form as indicated by Equation 7.

Figures 2 and 3 show one form of amplitude modulation, where the rate of amplitude change from one steady state to another is kept constant at a fixed time period $t_m$. In this case, there appears only one pair of complementary side-frequency-waves, and the shape of their power envelopes are indicated by the dotted lines. However, a modulation waveform such as shown occupies a bandwidth covering the entire space between the two side frequencies; even though the side-frequency-waves remain constant without side swings.

Here, the difference between side-frequency-wave and bandwidth is readily distinguished by the fact that, the first is manifested by the time shift of the carrier wave maxima from normal position, and the second is manifested as a consequence of dissymmetric contribution and cancellation of the carrier to the tuned circuit during a given time. Accordingly, in the ideal simple case of unity modulation, each envelope may be separated from its boundaries of substantially zero power level and transmitted as an independent carrier unit without expanding the spectral width outside the specified regions. Thus, these units may be transmitted by a controlled method: I, continuously, as in Fig. 4, wherein the magnitude of the envelope remains constant, but the phase angle in each envelope shifts in steady state step by sampling method; II, as in Figs. 6 and 7, wherein the time interval T between the envelopes may be any length of time; and III, as in Fig. 8, wherein each envelope of the carrier carries simultaneous amplitude and phase representations of elemental informations. Fig. 5 shows another case, wherein the frequency in each envelope is varied in steady state steps. In this case however, steps of side-band frequencies will extend beyond the normal bandwidth, and the method of modulation may be employed where bandwidth expansion is not objectionable. Figs. 2 and 3 show waveshapes of a controlled-modulated carrier wave in accordance with this invention, wherein, only amplitude modulation is employed.

Briefly therefore, in order to produce and transmit a carrier wave in the composite modulated form as described in the foregoing, the following steps are provided: Producing first and second intelligence waves, producing a carrier wave, time dividing the carrier into elemental envelopes at a frequency rate essential to convey intelligence, deriving first and second steady state electrical quantities from the first and second intelligence waves in time phase with the elemental envelopes, modulating the peak magnitudes of the carrier envelopes by the first quantities, simultaneously modulating the phase angle of the carrier in these envelopes by the second quantities, in a sense that, the peak magnitudes of the envelopes correspond to statistical magnitudes of the first intelligence wave; the phase angle of the carrier wave in the envelopes shifts from boundary to boundary in steady state steps representative of statistical magnitudes of the second intelligence, and pre-fixing the shape of each envelope to rise and fall to that of the curve of cosine function, thereby to restrict the signal variables in each envelope to steady states and thus restrict the total bandwidth to twice that of the time dividing frequency.

The above discussion on the theory and broad aspects of the present invention will now be followed by a description of the detailed circuits and modifications thereof which may be employed according to the invention. In the drawings.

Figure 9:
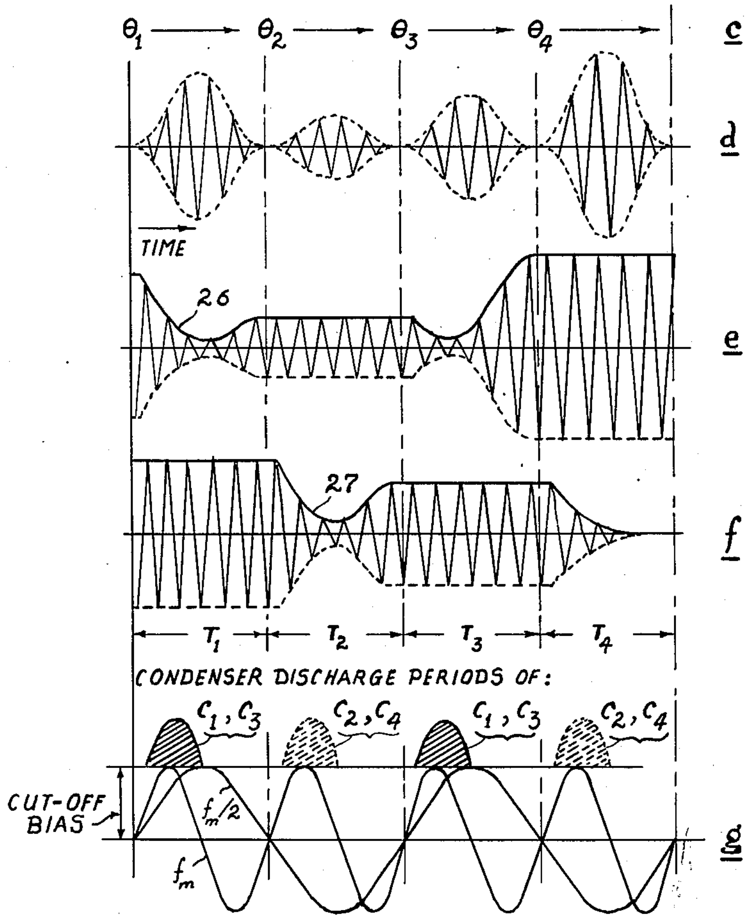
Figure 1:
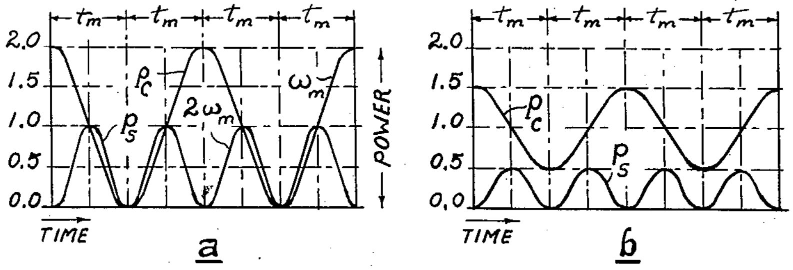
Fig. 1 is a graph showing power variation of a modulated carrier wave.
Figure 10:
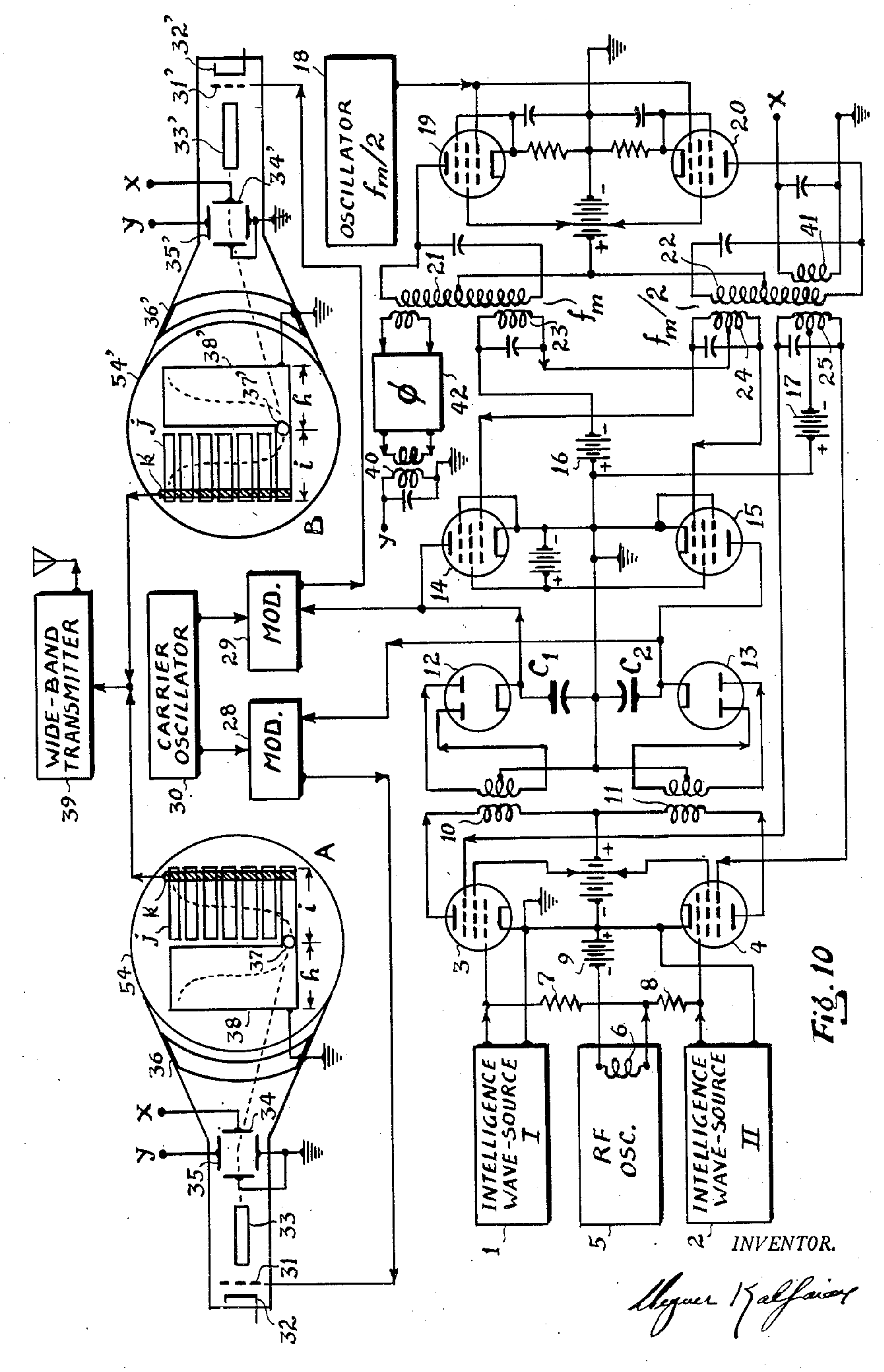
Figure 11:
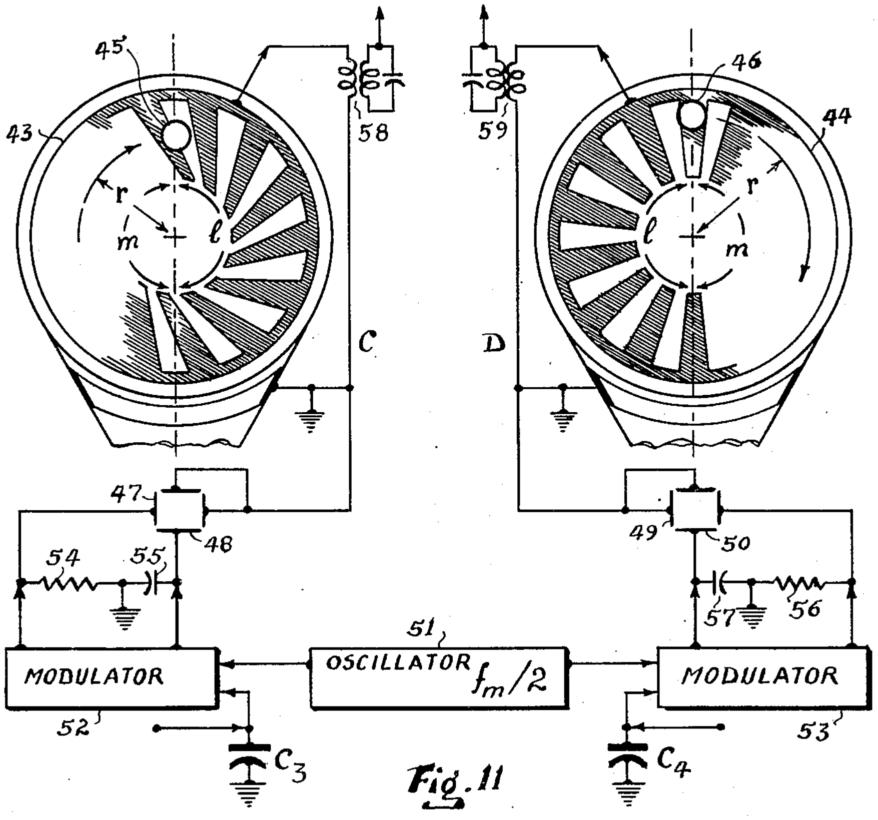

Fig. 9, *c–g* are various waveforms used in describing the operation of the circuit arrangements of Figs. 10 and 11.

Fig. 10 is a diagrammatic arrangement for amplitude modulation at the transmitter.

Fig. 11 is an arrangement utilized for phase modulating the carrier wave in connection with the arrangement of Fig. 10.

*AM modulator and sampler*

In Fig. 10, there are shown two intelligence wave sources, indicated by the roman numerals I and II, in blocks 1 and 2. These two intelligence waves may either originate from a single source, or two independent sources for time division multiplex transmission. In either case, the outputs of blocks 1 and 2 are connected to the control grids of modulator tubes 3 and 4, to modulate a high frequency wave, originated in block 5. The input circuits of these modulator tubes are connected in a conventional manner, wherein, the output impedance 6 of oscillator 5 is connected from grid to cathode terminals in series with the branched impedances 7 and 8 of blocks 1 and 2, and a normal bias potential 9. The modulated high frequency oscillations in the plate tank circuits 10 and 11 of these tubes are separately rectified through diodes 12 and 13, and charged across the storage condensers $C_1$ and $C_2$ respectively. These condensers are normally free of load impedances, and therefore, charge to the peak magnitude of the modulated oscillations, and retains their electrical quantities without decay thereafter. The discharge of these condensers is achieved periodically in alternate sequence by the grid controlled discharger tubes 14 and 15, which are normally biased to plate current cut-off by the bias supply 16. The function is that, while these tubes are rendered nonconductive, they act as high impedances across said condensers without disturbing their stored quantities. But, when the negative bias 16 is raised near cathode potential, the tubes 14 and 15 become plate current conductive and discharge their stored quantities. The alternate sampling of the intelligence waves across condensers $C_1$ and $C_2$ is obtained by operating the discharger tubes 14, 15 and modulator tubes 3, 4, in a predetermined sequence under control waves; the latter tubes being normally biased to plate current cut-off by the bias source 17. These control waves are obtained from generator 18, which normally oscillates at frequency $f_m/2$, equal to half or higher than the highest frequency component contained in the intelligence waves I and II. The output oscillatory voltage of 18 is applied simultaneously upon the control grids of vacuum tubes 19 and 20. The vacuum tube 19 acts as a frequency doubler, and its plate tank coil 21 is tuned to $f_m$, equal twice that of the input frequency. Whereas, tube 20 acts as a buffer amplifier, and its plate tank coil 22 is tuned to the input frequency $f_m/2$.

The voltage of the oscillatory wave $f_m$ from across coil 21 is inductively induced upon coil 23, and applied therefrom upon the control grids of discharger tubes 14 and 15 simultaneously through the center tap of coil 24, while the voltage of oscillatory wave $f_m/2$ from across coil 22 is inductively induced upon coil 24, and applied therefrom upon the grids of these tubes alternately by push-pull connection. The potential magnitudes as well as the phase differences across coils 23 and 24 are so adjusted that, while the added simultaneous first positive-half-cycle of the wave $f_m$ from across coil 23, and the first positive-quarter-cycle of $f_m/2$ from across coil 24 drive the control grid of one discharger tube near cathode potential for conductive operation, the first negative-quarter-cycle of the wave $f_m/2$ across coil 24 subtracts from the said positive-half-cycle of wave $f_m$ across the grid of the other discharger tube, thereby rendering the said discharger tubes to become conductive periodically in alternate sequence only during the first quarter-cycle periods of the wave $f_m/2$. Similarly, the oscillatory voltage across coil 22 is inductively induced upon coil 25, and applied therefrom upon the second control grids of modulator tubes 3 and 4 in push-pull, to render them operative in alternate sequence. Thus, when one discharger tube becomes conductive, for example, tube 14, to discharge a previously stored electrical quantity across condenser $C_1$ during the first quarter-cycle of wave $f_m/2$ from across coil 24, the second control grid of the modulator tube 3 is raised near cathode potential during most of the half-cycle period, allowing it to conduct and transmit the new incident magnitude of the modulated wave to be stored proportionally in condenser $C_1$ after its discharge operation. Accordingly, when the condenser $C_1$ is discharged and re-charged during one half-cycle period of $f_m/2$, the potential across condenser $C_2$ remains in a steady state value without disturbance, and vice versa.

For illustrative description of the various waveforms and their phase relations across coils 23, 24, 25 and condensers $C_1$ and $C_2$, reference is made to the graphical illustration in Fig. 9. For phase relations of the waves $f_m/2$, assume that during the time area $T_1$ at *g*, the positive half-cycle of wave $f_m/2$ drives the control grid of discharger tube 14 just short of plate current conductance. In addition, the positive half-cycle of wave $f_m$ further drives the said grid near cathode potential, and the tube becomes conductive during the shaded area. Thus, during the area $T_1$, the condenser $C_1$ is discharged from its previous storage and recharged to a new quantity, as indicated by the solid line 26 of approximate waveform, at *e*.

Similarly, during the following period $T_2$, the condenser $C_2$ becomes discharged and recharged, as indicated by the solid line 27, at *f*.

The steady state output voltages of condensers $C_1$ and $C_2$ are applied upon the modulator blocks 28 and 29, wherein the carrier wave from block 30 is modulated in the form, as illustrated at *e* and *f*, in Fig. 9. Thus, during time period $T_1$, the carrier output of modulator 29 is in a steady state corresponding to an incident magnitude of the intelligence wave, while the carrier output of the modulator 28 is in a state of shifting its magnitude. Similarly, during time period $T_2$, the carrier output of the modulator 28 is in a steady state corresponding to an incident magnitude of the intelligence wave, while the carrier output of the modulator 29 is in a state of shifting its magnitude.

These modulated carrier waves from blocks 28 and 29 are applied upon the intensity control grids 31 and 31′ of special cathode ray modulator tubes A and B respectively. The tubes A and B are similar in structure, and comprise similar component parts as indicated by the following respective numerals: electron emitting cathode 32, 32′; electron beam forming electrode 33, 33′; horizontal beam deflecting plates 34, 34′; vertical beam-deflecting plates 35, 35′; secondarily emitted electron collector 36, 36′; cathode-emitted electron beam 37, 37′; and modulator target 38, 38′ in the path of the said beam. The D. C. potentials necessary for the various elements of tubes A and B are not shown for simplicity of drawing, as these connections are known to the skilled in the art of electronics. The application of the carrier outputs of the modulators 28 and 29 upon the control grids 31 and 31′ of tubes A and B serve to vary the intensities of the electron beam 37 and 37′ impinging upon the targets 38 and 38′, in the modulated forms, as illustrated at *e* and *f*, in Fig. 9, while these targets serve to re-modulate for final shaping and transmitting of the carrier wave.

Since, the structure and function of the targets of tubes A and B are similar, the target of tube A may be taken as a typical example to explain the operation of the system.

The target 38 is divided into two parts: *h* and *i*. The part *h* consists of a uniform conductive surface in a plane perpendicular to the flow of the electron beam 37, and is electrically grounded to return the current of the impinging beam directly to the emitting cathode 32. Thus, while the beam 37 is swept across any area of the part *h*, all of the beam current is short-circuited to ground, and the output signal is zero. Whereas, the part *i* is further divided into a plurality of parallel strips *j*, which are mutually connected to the extended strip of the part *h*, by the resistive element K in steps of progressively increasing values. Thus, when the beam 37 impinges upon the extreme lower end of part *i*, the current of the beam is short-circuited to ground. But, as the beam sweeps upward vertically, the current of the beam returns to ground through progressively increasing values of the resistive element *k*, and the voltage across the total of this resistance becomes a linear function of the vertical displacement of the beam from normal zero value at the extreme lower end position of the part *i*. The electron collector 36 may be provided with a positive potential with respect to ground, to ensure that the secondarily emitted electrons are collected, which might otherwise introduce noise in the output circuit.

Figures 2, 3, 4, 5, 6, 7, 8:
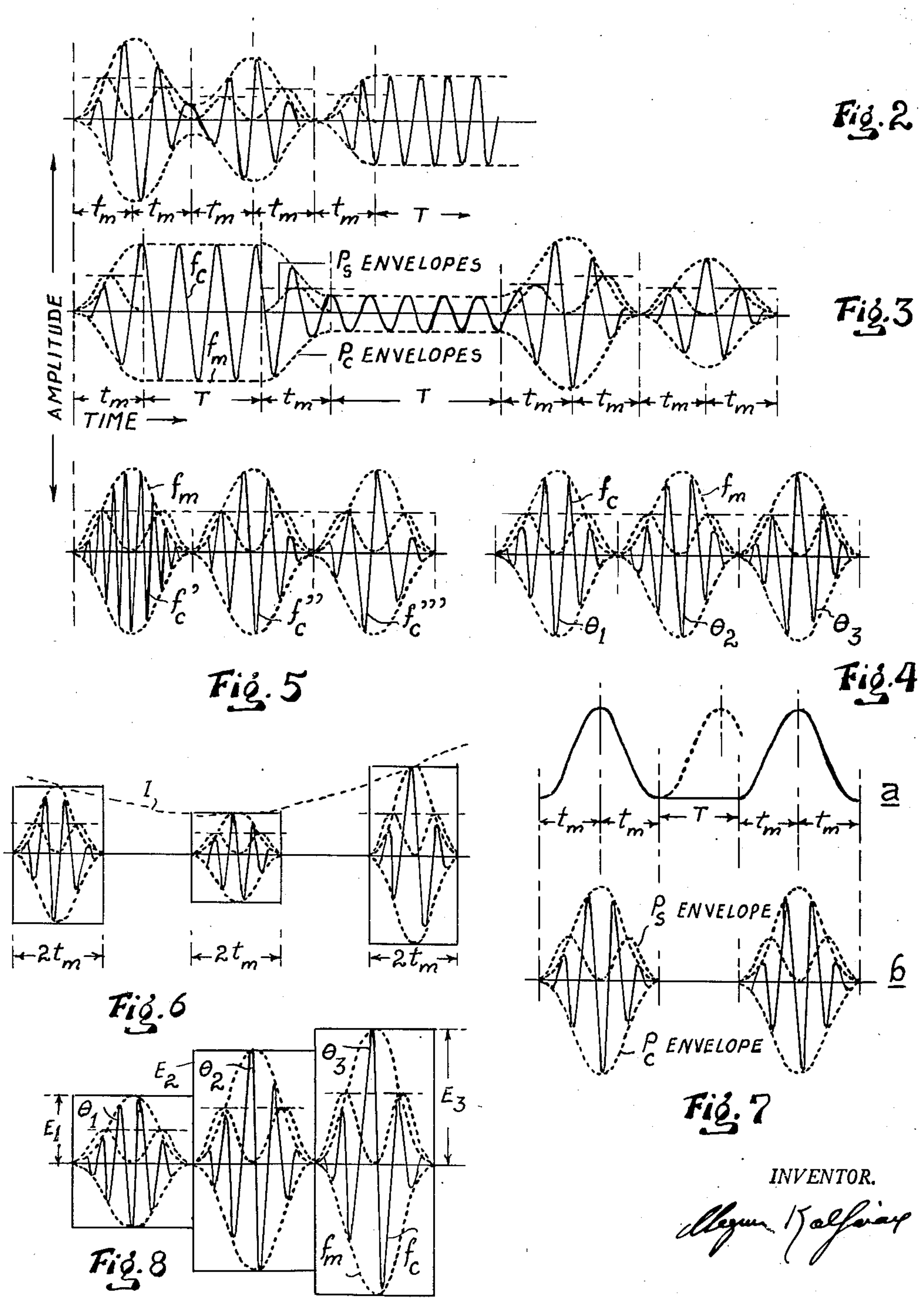
Figs. 2–8 illustrate the various types of modulation of the carrier wave.

In operation, the modulated carriers at *e* and *f* in Fig. 9, are re-modulated into the final form of transmitted envelopes, as at *d*, by the modulator targets in a manner that, the target of tube A produces the envelopes during the time periods $T_1$ and $T_3$, while the target of tube B produces the envelopes during the time periods $T_2$ and $T_4$, which are finally combined to produce the continuous envelopes in the broad band amplifier 39 for final transmission. To effect this operation, the sine wave of frequency $f_m$ from across coil 40 is applied upon the vertical deflecting plates 35, 35′ of tubes A and B in parallel; the connections of which are indicated by the letter *y*. Whereas, the sine wave of frequency $f_m/2$ from across coil 41 is applied upon the horizontal deflecting plates 34, 34′ by cross-connection, so that, while one beam sweeps across part *h*, the other beam sweeps across part *i* of the targets of tubes A and B; their connections being indicated by the letter *x*. The phase relations of the last said waves are so adjusted that, for example by phasing block 42, when any one of the horizontally deflected beams sweep across part *i* of the target, the magnitude of the carrier at *e* or *f* in Fig. 9, is in a steady state. Thus, the carrier wave appears at the output of the targets 38, 38′, only during the periods when the carrier magnitude is in a steady state periodically in alternate sequence. Furthermore, when the switching wave $f_m/2$ is at its zero axis (the switching position of the beam), the sine wave $f_m$ is at its lower slope, which effects the beam to impinge upon the target at this instant at the position shown in the drawing. Thus, at this switching point, the carrier output of the target is substantially zero, and rises in magnitude in the shape of a cosinusoidal function as the beam sweeps in upward direction by the sine wave $f_m$. Since, the targets of tubes A and B produce periodic envelopes as in Fig. 6 in alternate sequence, continuous envelopes is in Fig. 8 will appear across the parallel connected output, which is further amplified by 39 and radiated therefrom.

*PM modulator*

Various types of phase modulation may be employed with the present invention. For example, in one conventional mode of phase modulation, the carrier phase angle is shifted against a reference phase angle. The modulated carrier is then compared with a reference carrier, which is generated locally at the receiver. To adapt this type of phase modulation with the present invention, the phase angle of the carrier in each envelope is shifted in steady state steps against a reference angle. The second type of phase modulation is to shift the phase angle in every other envelope in steady state steps, and transmit the reference phase angle of the carrier in-between these envelopes. In this mode of modulation, the carrier envelopes are received periodically in two separate channels, and their outputs compared for intelligence translation. A third type of modulation is to shift the carrier phase in each enevelope in steady state steps, in a sense that, each step of phase change represents a reference phase angle to a succeeding step of phase change. A carrier having this type of modulation when passed through a tuned circuit, inherently changes to frequency modulation, which may be detected by conventional frequency discriminators. Only the first two types of modulation will be given herein.

For the second type of phase modulation, reference is made to the phase shifting targets 43 and 44 of cathode ray tubes C and D, in Fig. 11. The target 44 of tube D consists of a circular conductive plate comprising a plurality of evenly spaced slits oriented such as each to have its longer axis aligned with the radius of the circle, whereas, the target 43 of tube C consists of a circular conductive plate comprising the same number of evenly-spaced slits, but so oriented that, when both plates were placed in juxtaposition, the longer axis of any one of the slits on one plate would cross the longer axes of two adjacent slits on the other plate; the angle of such crossing being dependent upon the spacings between adjacent slits. The cathode ray tubes C and D comprise the usual elements, but are omitted from the drawing for simplicity. However, the electron beams produced therein, are indicated by the small circles 45 and 46, to show their sweeping synchronism upon their respective targets. The beams 45 and 46 are synchronously deflected in circular motion by a quadrature-phased sine wave applied upon the electrostatic deflecting plates 47, 48 and 49, 50. This sine wave is supplied by the oscillator 51, the output of which is independently amplitude modulated in modulator circuits 52 and 53; phase split by RC networks 54, 55, and 56, 57; and applied upon the said deflecting plates.

When the quadrature phased oscillatory voltages are synchronously applied upon the deflecting plates of tubes C and D, the electron beams 45 and 46 rotate, causing current interruptions across the targets, through the output inductances 58 and 59. Thus, the frequency of current variation across these inductances may be made equal to the carrier frequency by arranging the targets with a predetermined number of slits. In addition, the phase angle of the current variation in coil 58 may be shifted with regard to the current variation in coil 59, by shifting the radius of rotation of the beam 45, by virtue of the said angular displacements of the slits of target 43.

In operation, a phase modulating voltage is sampled periodically by the condenser $C_3$ in phase with the condenser $C_1$ in Fig. 10. Also, the phase of the oscillator 51 is so adjusted that, the beams 45 and 46 travel across the circular areas *l* of the targets 43 and 44 when the voltage across condenser $C_3$ is in a steady state. Thus, by the periodic steady state amplitude modulation in modulator 52, the phase angle of output carrier oscillation in coil 58 will shift in steady state steps during the periods $T_2$ and $T_4$, etc., in Fig. 9. Since, reference is made to the second type of phase modulation, as mentioned above, the condenser $C_4$ will be considered omitted. Accordingly, the carrier oscillation in the output coil 59 will be of constant reference angle.

In order to combine the arrangement of Fig. 11 with the arrangement in Fig. 10, for simultaneous amplitude and phase modulation in accordance with the invention, the carrier wave oscillator 30 in Fig. 10 is replaced by the arrangement of Fig. 11. That is, carrier outputs of coils 58 and 59 in Fig. 11 are directly applied upon the modulators 29 and 28 respectively, as indicated in Fig. 10.

In the event that the phase modulation is chosen to be in the first mentioned type, as shown at *c* in Fig. 9, the condenser $C_4$ in Fig. 11 is included, and the target 44 of tube D is replaced by a target similar to the target in tube C, for alternate phase shifts of the carrier.

Since, the output phase of the carrier wave must individually remain in steady state steps during only the areas *l* of targets 43 and 44, the slits in the opposite areas may be dissymmetric for the production of odd carrier frequencies, when the frequency of the oscillator 51 is to be maintained constant and the number of slits of the targets are to be changed for different carrier channels.

*Receiver*

The receiving apparatus in connection with the type of transmission employed herein may be of any conventional type having a bandwidth equal twice that of the frequency at which the carrier is time divided. However, in order to eliminate elaborate band-pass arrangements, I may employ a simple tuned circuit of low decrement, to receive the incoming time divided envelopes of the carrier at periodic intervals, and dampen out the stored oscillations in the circuit by force in-between these intervals. I may also employ a second tuned circuit to operate at sequential intervals with respect to the first said circuit, so that continuous reception may be achieved. Reference to this type of reception may be made to Patent No. 2,157,312, Wright, issued on May 9, 1939, the disclosure of which is hereby made a part of the present application as if fully included herein, although the said disclosure differs in purpose.

While I have described particular embodiments of the invention, numerous substitutions of parts, adaptations and modifications are possible without departing from the spirit and scope thereof. Furthermore, the number of modulating signals is not limited to only two intelligence waves; one for amplitude and one for phase modulation, as other intelligence waves may be included in the transmission by time sequence in the time divisions as set forth herein. In such case, the bandwidth of the transmitted carrier will be equal to the total of the highest frequency components contained in the multiplex signals.

What I claim is:

1. The system of simultaneously amplitude and phase modulating a carrier wave by first and second intelligence waves, which comprises means to produce first and second intelligence waves, means to produce a carrier wave in first and second branches, a switching means and means therefor to time divide the carrier in said first and second branches in alternate sequence at a frequency rate essential to convey said intelligence, means to combine outputs of the first and second branches, whereby to obtain the carrier comprising time divided alternate portions in the first and second branches, first and second storage means, means to apply the first intelligence wave upon the first and second storage means, means to operate the first and second storage means on and off alternately by said switching means, at such time-phase that, the first and second storage means store and retain alternate substantially steady state electrical quantities representative of the first intelligence; during output portions of the carrier in said first and second branches, phase modulator or modulators and means therefor to modulate phase angle of the carrier in the first and second branches by said alternate steady state quantities, whereby the carrier wave in each time divided portion of said combined outputs is shifted by an angle representative of the first intelligence in constant state from boundary to boundary, thereby to avoid effective frequency modulation during each successive time division period, third and fourth storage means, means to apply the second intelligence wave upon the third and fourth storage means, means to operate the third and fourth storage means alternately by said switching means in similar manner and in-phase with the aforesaid storage means, whereby to obtain third and fourth substantially steady state electrical quantities representative of the second intelligence, amplitude modulator or modulators and means therefor to modulate amplitude of the carrier by last said quantities in the first and second branches, whereby each time-divided portion of the carrier at said combined output contains simultaneous amplitude modulation by said second intelligence, means to waveshape the amplitude of each successive time division of the carrier wave, so that at the boundaries the carrier amplitude is substantially negligibly low, whereby to avoid appreciable sudden transient effect of the carrier wave due to sudden phase and amplitude change at the boundaries, and the rise and fall at the boundaries are shaped substantially approximating to that of the sine-squared function, thereby to avoid widely expanded multiple pairs of complementary sidebands that are usually associated with steep sided rise and fall of the carrier envelopes, and means to transmit the final modulated carrier wave.

2. As set forth in claim 1, which includes means to receive said transmitted wave, and means to re-translate said amplitude and phase modulations into their respective original intelligence waves.

3. As set forth in claim 1, wherein said storage means for deriving steady state electrical quantities representative of said first and second intelligence waves comprise the following parts: first and second storage condensers, first and second charging devices, means to apply the first intelligence wave upon last said devices for charging said condensers by quantities proportional corresponding to the static amplitudes of the first intelligence, first and second discharging devices for discharging said condensers, negative bias potentials for the first and second charging and discharging devices to render them normally inoperative, means to derive first and second positive potentials from said switching means at the rate of said time dividing frequency and means therefor to apply last said potentials alternately upon the first and second charging devices to render them alternately operative and charge the first and second condensers in alternate sequence by quantities corresponding to statistic amplitudes of the first intelligence, means to derive from said switching means positive potentials during a portion of approximately commencing last said first and second potentials and means therefor to apply same upon the first and second discharging devices for operation, thereby to alternately discharge the first and second condensers of their previously stored quantities prior to final charging during said charging periods for full storage in constant states thereafter, and third and fourth condensers; including third and fourth charging and discharging devices therefor; and means to operate same in the aforementioned manner for deriving steady state electrical quantities representative of the second intelligence wave.

MEGUER KALFAIAN.

REFERENCES CITED

The following references are of record in the file of this patent:

UNITED STATES PATENTS

| Number | Name | Date |
|---|---|---|
| 1,928,093 | Coyle | Sept. 26, 1933 |
| 2,189,898 | Hartley | Feb. 13, 1940 |
| 2,256,317 | Earp | Sept. 16, 1941 |
| 2,328,944 | Beatty | Sept. 7, 1943 |
| 2,403,385 | Loughlin | July 2, 1946 |
| 2,403,957 | Seeley | July 16, 1946 |
| 2,423,769 | Goldsmith | July 8, 1947 |
| 2,427,500 | Houghton | Sept. 16, 1947 |
| 2,428,118 | Labin et al. | Sept. 30, 1947 |
| 2,429,631 | Labin | Oct. 28, 1947 |
| 2,474,244 | Grieg et al. | June 28, 1949 |

FOREIGN PATENTS

| Number | Country | Date |
|---|---|---|
| 647,468 | Germany | July 5, 1937 |

OTHER REFERENCES

Band-Width Requirements, W. W. Hansen, QST, February 1945, pages 11–13.

Evaluation of Transmission Efficiency, Calvier Electrical Communications, December 1948, 414–420.